United States Patent
Campbell

(10) Patent No.: US 6,808,045 B2
(45) Date of Patent: Oct. 26, 2004

(54) SECONDARY ACOUSTIC ATTENUATOR FOR VEHICLE

(75) Inventor: Michael T. Campbell, Grand Rapids, MI (US)

(73) Assignee: Dow Global Technologies, Inc., Midland, MI (US)

( * ) Notice: Subject to any disclaimer, the term of this patent is extended or adjusted under 35 U.S.C. 154(b) by 0 days.

(21) Appl. No.: 10/306,146

(22) Filed: Nov. 27, 2002

(65) Prior Publication Data

US 2004/0099474 A1 May 27, 2004

(51) Int. Cl.$^7$ .......................... G10K 11/16; F24F 13/20; F24F 13/24
(52) U.S. Cl. ................. 181/205; 181/204; 454/906; 277/916
(58) Field of Search .................................... 181/205, 204, 181/202, 200, 224, 225, 226, 290; 454/906, 206, 262, 346; 248/56, 111; 277/212 C, 212 F, 916

(56) References Cited

U.S. PATENT DOCUMENTS

| | | | | |
|---|---|---|---|---|
| 3,918,541 A | | 11/1975 | Krieger ................. 180/69 R |
| 4,083,595 A | * | 4/1978 | Maier ..................... 181/290 |
| 4,823,909 A | | 4/1989 | Nakamura et al. ......... 181/290 |
| 5,243,153 A | * | 9/1993 | Holwerda ................ 248/56 |
| 5,557,078 A | | 9/1996 | Holwerda ................ 181/208 |
| 5,806,139 A | * | 9/1998 | Anderson et al. .......... 16/2.1 |
| 5,824,974 A | * | 10/1998 | Campbell ................. 181/290 |
| 5,836,813 A | | 11/1998 | Miyata et al. ............. 454/139 |
| 6,070,928 A | * | 6/2000 | Campbell ................ 296/39.3 |
| 6,110,985 A | | 8/2000 | Wheeler .................. 521/83 |
| 6,231,116 B1 | | 5/2001 | Naert et al. ............... 296/192 |
| 6,305,494 B1 | | 10/2001 | Pfaffelhuber et al. ...... 181/286 |
| 6,382,305 B1 | | 5/2002 | Sano ...................... 165/43 |
| 6,550,571 B1 | * | 4/2003 | Kimura et al. ............ 181/204 |

* cited by examiner

*Primary Examiner*—David Martin
*Assistant Examiner*—Edgardo San Martin
(74) *Attorney, Agent, or Firm*—Price, Heneveld, Cooper, DeWitt & Litton

(57) ABSTRACT

An acoustic barrier systems that reduces the amount of noise entering the passenger compartment of a vehicle includes a secondary acoustic attenuator that extends from a primary acoustic barrier to a vehicle component case to envelop space around a conduit passing from the engine compartment to the component case. In one embodiment, the secondary acoustic attenuator extends from the primary acoustic barrier to the component case, with the secondary acoustic attenuator enveloping space around the conduit between the vehicle component case and the primary acoustic barrier. In another embodiment, the secondary acoustic attenuator is hingedly connected to the primary acoustic barrier to allow the secondary acoustic attenuator to be pivoted, from an orientation that allows installation of the vehicle component case, to another orientation wherein the secondary acoustic attenuator engages the vehicle component case to envelop space around the conduit between the vehicle component case and the primary acoustic barrier.

17 Claims, 4 Drawing Sheets

SECONDARY ACOUSTIC ATTENUATOR FOR VEHICLE

FIELD OF THE INVENTION

This invention relates to acoustic barriers for vehicles and more particularly to an improved acoustic barrier system for reducing transmission of noise from the engine compartment of a vehicle into the passenger compartment.

BACKGROUND OF THE INVENTION

It has been a common practice in the automotive industry to employ a double wall barrier system to reduce noise from the engine compartment to the passenger compartment of a motor vehicle. The acoustic barrier system generally comprises a steel wall separating the engine compartment from the passenger compartment and a dash barrier spaced away from the passenger compartment side of the steel wall. A foam or fiber sound-absorbing material is typically disposed in the space defined between the steel wall and the dash barrier.

The heater case, frequently referred to as the HVAC (heating, ventilation and air conditioning) unit, is installed in the passenger compartment over the dash barrier. Apertures through the steel wall and dash barrier are provided for tubes used to convey engine coolant or refrigerant to and from the HVAC unit. Foam seals are used to fill any spaces between the tubes and the openings for the tubes to reduce the amount of noise entering the passenger compartment and to prevent water or other materials from entering the passenger compartment. However, as is frequently the case with components that are required to perform multiple functions, the foam seals do not perform both functions as effectively as may be desired. In particular, the seal must exhibit optimum moisture sealing properties, with acoustic barrier properties being of secondary importance. As a result, there is a need for more effective noise reduction than has been provided by conventional foam seals that have been used at refrigerant tube openings through the double wall barrier. A similar need for improved noise reduction exists at other pass-through openings for conduits to vehicle components, such as electrical control boxes, mounted in the passenger compartment adjacent the acoustic barrier.

U.S. Pat. No. 5,557,078 discloses an acoustic barrier for a wall having an opening with a conduit, such as a hose, cable or wire, passing through the opening and an article such as an electrical control box mounted on one side of the wall. A moisture seal is located in the wall opening, and a mass layer of resilient or flexible plastic (e.g., filled thermoplastic olefin) is positioned adjacent the wall. The mass layer includes a support rib defining an opening in the mass layer in registry with the wall opening and surrounding the article. The mass layer further includes a flexible seal extending inwardly into the mass layer opening from an edge thereof in contact with the article to provide an acoustic seal around the article. In the disclosed embodiment, the flexible seal comprises a plurality of flexible flaps separated from each other by slots. The flexible flaps are resilient and bear against the article to form the acoustic seal between opposite sides of the wall.

The only illustrated embodiment in U.S. Pat. No. 5,557,078 is for a relatively small electrical control box having a back wall that completely abuts against the moisture seal, with the flexible flaps engaging against top, bottom and side walls of the electrical control box. Thus, the disclosed acoustical barrier appears to have limited application.

Accordingly, there remains a need for an improved acoustic barrier system for reducing noise transmission from the engine compartment to the passenger compartment at conduit pass-through apertures, which is useful in a variety of different applications.

SUMMARY OF THE INVENTION

The invention provides a secondary acoustic barrier to reduce the amount of noise entering the passenger compartment of a vehicle. In particular, the secondary acoustic barrier extends from a primary acoustic barrier to a vehicle component case to envelop space around a conduit passing from the engine compartment to the component case.

In one aspect of the invention, a vehicle comprises an engine compartment, a passenger compartment, a metal wall separating the passenger compartment from the engine compartment, and a primary acoustic barrier disposed adjacent the metal wall. An aperture is defined through the metal wall for passage of a conduit, and an aperture is also defined through the primary acoustic barrier for passage of the conduit. The aperture through the primary acoustic barrier is in registry with the aperture through the metal wall. A case for a vehicle component is mounted in the passenger compartment adjacent the primary acoustic barrier, and a moisture seal is used for sealing between the conduit and the metal wall. In order to achieve improved noise reduction in accordance with the invention, an acoustic attenuator extends from the primary acoustic barrier to the component case to envelop space around the conduit between the component casing and the primary acoustic barrier.

These and other features, advantages and objects of the present invention will be further understood and appreciated by those skilled in the art by reference to the following specification, claims and appended drawings.

DESCRIPTION OF THE PREFERRED EMBODIMENTS

Figure 1:
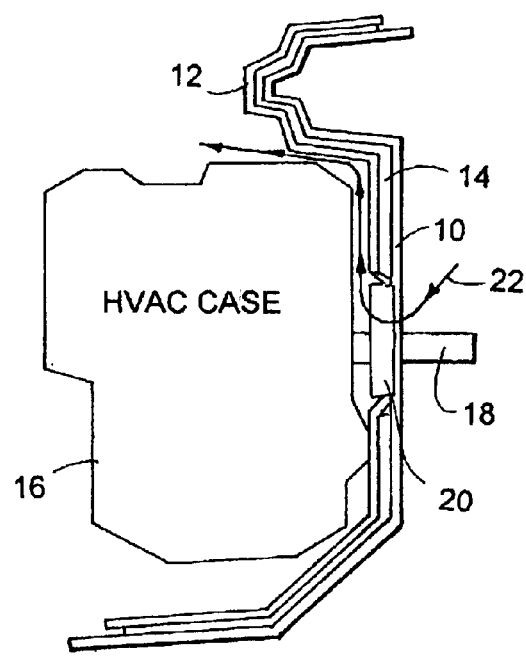
FIG. 1 is a schematic cross section of a metal wall and acoustic barrier separating an engine compartment of a vehicle from the passenger compartment of a vehicle, with an HVAC case mounted on the passenger compartment side of the wall in accordance with the prior art.

Shown in FIG. 1 is a conventional metal wall 10 separating an engine compartment from a passenger compartment of a vehicle. An acoustic barrier 12 is located in the passenger compartment side of wall 10 and is spaced from wall 10 by a sound absorbing, decoupler layer 14. Acoustic barrier 12 is typically made of a relatively dense, resilient or flexible synthetic plastic material, such as a barium sulfate filled polypropylene, rubber modified polypropylene, elastomer-modified polyurethanes, thermosets such as polyurethanes, or other filled thermoplastic materials. Sound absorbing decoupler layer 14 is typically a foam plastic material (e.g., expanded polyurethane) or fibrous material (e.g., nonwoven glass fiber mat, shoddy cotton or other relatively low density, porous insulating materials that are commonly employed to absorb sound and/or act as a decoupling layer in an acoustic barrier assembly).

Mounted on the passenger side of the wall 10, barrier 12, and decoupler layer 14, is an automotive component case 16, such as an HVAC case. Apertures or openings are provided through wall 10, barrier layer 12, and decoupler layer 14, in registry with each other, to allow conduit 18 to pass from the engine compartment to vehicle component casing 16. In the illustrated embodiment, conduit 18 is a tube for passage of refrigerant to or from an HVAC case. However, a similar structure is commonly utilized for passing other conduits 18 to other vehicle components. For example, a similar arrangement is used to allow an electrical wire bundle to pass from the engine compartment to an electrical control box mounted on the passenger compartment side of metal wall 10.

In order to prevent moisture from entering from the engine compartment to the passenger compartment, and to help reduce noise from the engine compartment to the passenger compartment, a seal 20 around conduit 18 is provided for sealing between the conduit and the metal wall. Seal 20 is primarily designed as a moisture seal, and may be made of a moisture impermeable plastic foam, such as expanded polyurethane.

A disadvantage with the arrangement shown in FIG. 1 is that noise from the engine compartment passes through foam seal 20, which is a relatively weak acoustic barrier, and along a path, such as path 22, between case 16 and barrier layer 12, into the passenger compartment.

The invention utilizes a secondary acoustic attenuator (i.e., an acoustic barrier or an acoustic absorber) that closes off paths, such as path 22, to prevent or reduce the transmission of noise along spaces between the case 16 and barrier 12, and further reduce noise from the engine compartment to the passenger compartment.

Figure 2:
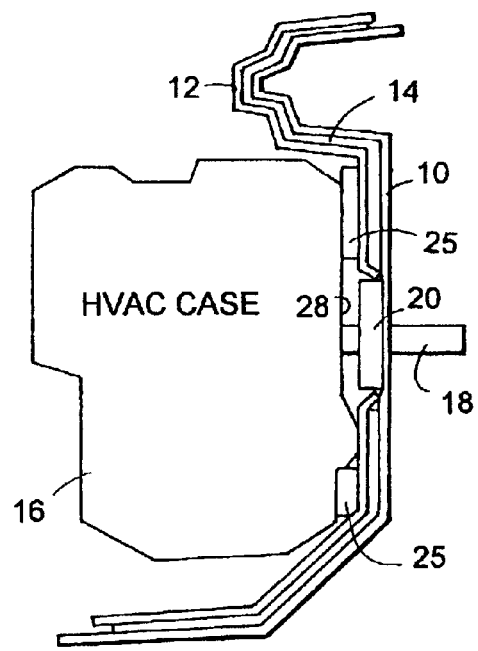
FIG. 2 is a schematic cross section of a metal wall and acoustic barrier separating an engine compartment from the passenger compartment of a vehicle, with an HVAC case mounted on the passenger compartment side of the metal wall, and employing a secondary acoustic seal in accordance with one embodiment of the invention.

A secondary acoustic attenuator in accordance with an embodiment of the invention is illustrated in FIG. 2. The arrangement (in FIG. 2) is substantially the same as that shown in FIG. 1, except that a secondary acoustic attenuator 25 has been positioned between the back wall 28 of case 16 and primary acoustic barrier 12. Desirably, secondary acoustic attenuator 25 is a continuous loop or ring that circumscribes conduit 18 in the space between wall 28 and acoustic barrier layer 12 to eliminate all pathways that would permit free propagation of sound waves. Secondary acoustic attenuator 25 may be formed of generally any suitable sound absorbing material such as a polymer foam material, any suitable acoustic barrier materials such as those used for fabricating primary acoustic barrier 12, or a combination of acoustic barrier and sound absorbing materials. Suitable sound absorbing materials include polyurethane foams, polyolefin foams, and fibrous mats such as glass fiber mats. Suitable barrier materials include flexible and/or resilient thermoplastic materials, such as barium sulfate filled polypropylene.

Figure 3:
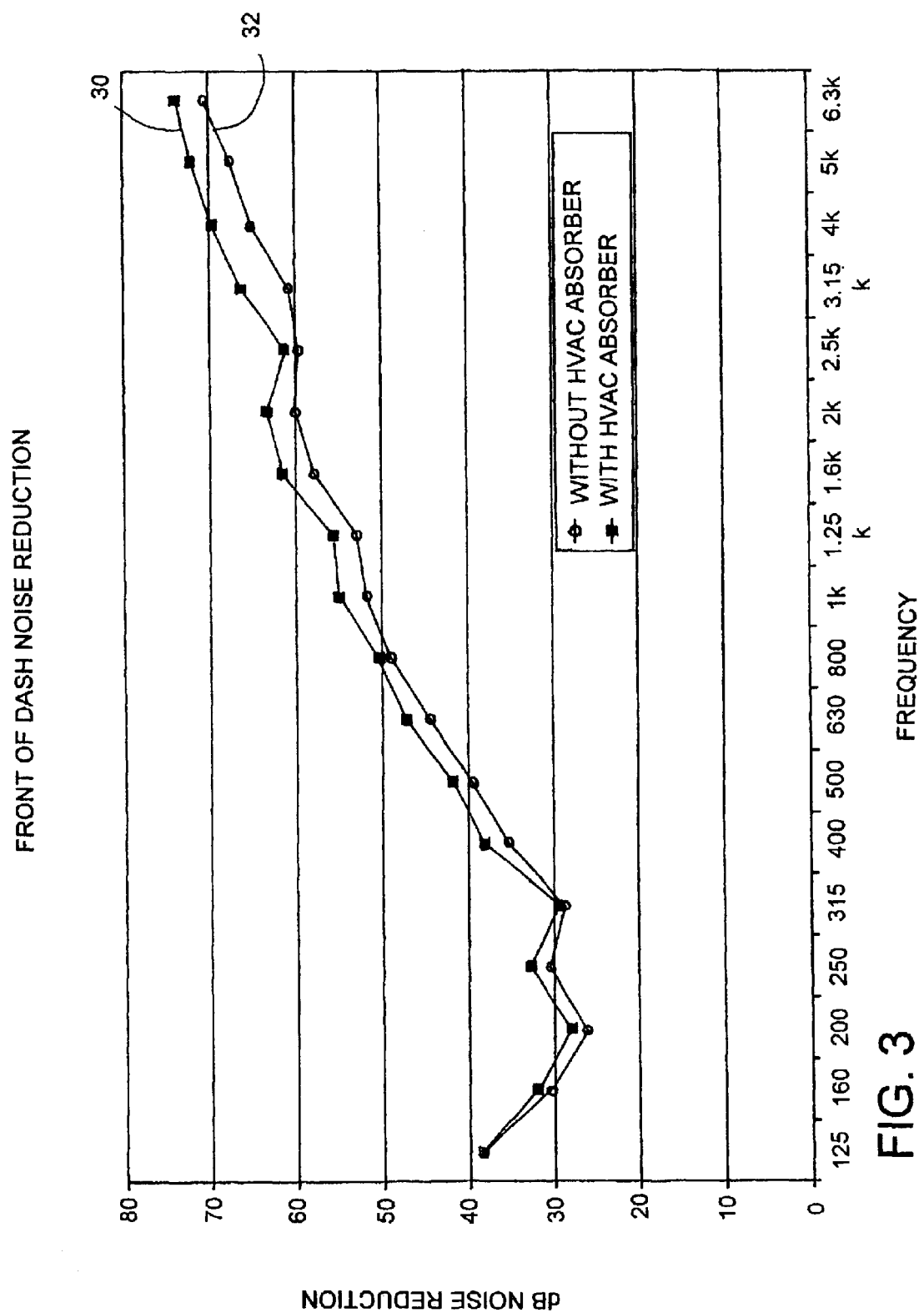
FIG. 3 is a graph comparing noise reduction as a function of frequency for the prior art arrangement as shown in FIG. 1 with noise reduction for the embodiment of the invention shown in FIG. 2.

As shown in FIG. 3, the secondary acoustic attenuator (foam material) as shown in FIG. 2 provides improved noise reduction (represented by curve 30), as compared with a conventional arrangement as shown in FIG. 1 (represented by curve 32). As can be seen from the graph in FIG. 3, an improvement in noise reduction is achieved over the entire range of audible frequencies, and an improvement in excess of 5 decibels is achieved in the higher frequency range.

Figure 4:
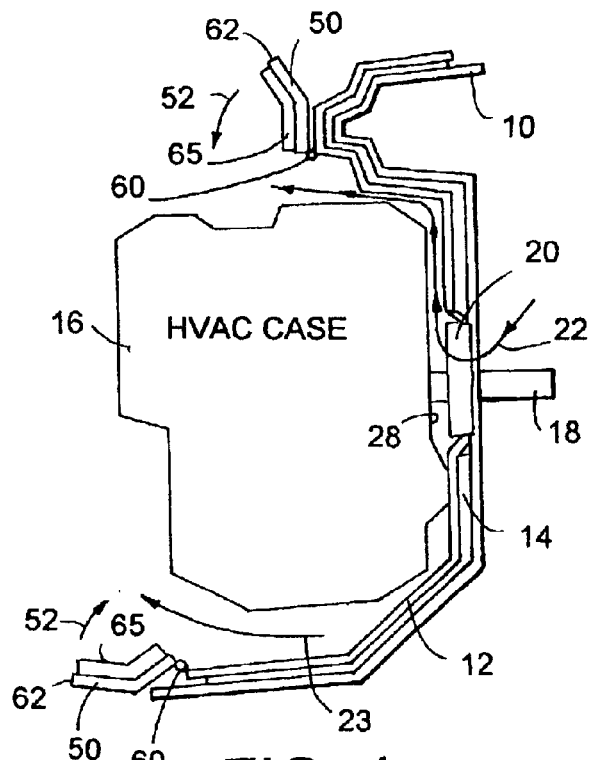
FIG. 4 is a schematic cross section of a metal wall and acoustic barrier separating an engine compartment from a passenger compartment of a vehicle, with an HVAC case mounted on the passenger side of the metal wall, and with a secondary acoustic barrier hingedly mounted to a primary acoustic barrier, with the secondary acoustic barrier positioned in a pre-installation orientation.
Figure 5:
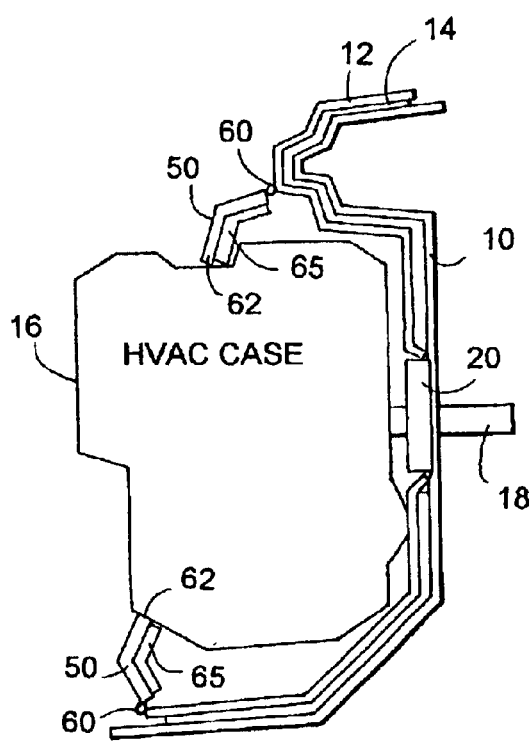
FIG. 5 is a schematic cross section of a metal wall and acoustic barrier separating the engine compartment from the passenger compartment of a vehicle, and with an HVAC case mounted on the passenger compartment side of the metal wall, as shown in FIG. 4, but with the secondary acoustic barrier pivoted into engagement with the HVAC case to envelop space around a conduit from the engine compartment to the HVAC case between the HVAC case and the primary acoustic barrier.

Shown in FIGS. 4 and 5 is another embodiment of the invention employing a secondary acoustic barrier 50 that is hingedly connected to a primary acoustic barrier 12 to allow secondary acoustic barrier 50 to be pivoted from an orientation that allows easy installation of a vehicle component casing, such as an HVAC casing, to another orientation that provides enhanced sound reduction. The arrangement shown in FIGS. 4 and 5 is otherwise similar to the conventional arrangement shown in FIG. 1. After case 16 has been installed, secondary acoustic barrier 50 is pivoted as indicated by arrows 52, so that secondary acoustic barriers 50 are positioned as shown in FIG. 5. In particular, secondary acoustic barrier 50 is pivoted around hinge 60 so that end 62 of secondary acoustic barrier 50 engages case 16. If desired, features, such as spaced apart ribs, may be provided on the exterior walls of case 16 to facilitate positive engagement between the edges 62 of secondary seal 50 and the outer walls of case 16. As another alternative, an adhesive or other fastener may be employed to retain barrier 50 in the orientation shown in FIG. 5.

Desirably, secondary acoustic barrier 50 circumscribes case 16 when pivoted into engagement with case 16 as shown in FIG. 5 to eliminate all unimpeded paths for sound transmission, such as paths 22 and 23 (shown in FIG. 4).

To further enhance noise reduction, a sound absorbing layer 65 may be provided. Sound absorbing layer 65 is coextensive with secondary acoustic barrier 50 and is located on the side of secondary acoustic barrier 50 which faces primary acoustic barrier 12. Sound absorbing layer 65 is preferably a foamed plastic material, e.g., expanded polyurethane, and may be attached to secondary acoustic barrier 50 with mechanical fasteners, adhesives, or the like.

Secondary acoustic barrier 50 may be hingedly connected to primary acoustic barrier 12 in any suitable manner that allows secondary acoustic barrier 50 to be pivoted from a position as shown in FIG. 4, which allows installation of case 16, to a position as shown in FIG. 5, which reduces noise transmission from the engine compartment to the passenger compartment of a vehicle. One suitable method of forming the acoustic barrier system shown in FIGS. 4 and 5 is to integrally mold primary acoustic barrier 12, secondary acoustic barrier 50 and hinge 60 together, whereby hinge 60 provides a flexible integral connection between primary acoustic barrier 12 and secondary acoustic barrier 50, i.e., hinge 60 acts as a living hinge. Alternatively, primary acoustic barrier 12 and secondary acoustic barrier 50 may be formed separately and subsequently thermally or chemically fused together. Mechanical fasteners and/or adhesives may also be employed to hingedly connect secondary acoustic barrier 50 to primary acoustic barrier 12.

Figure 6:
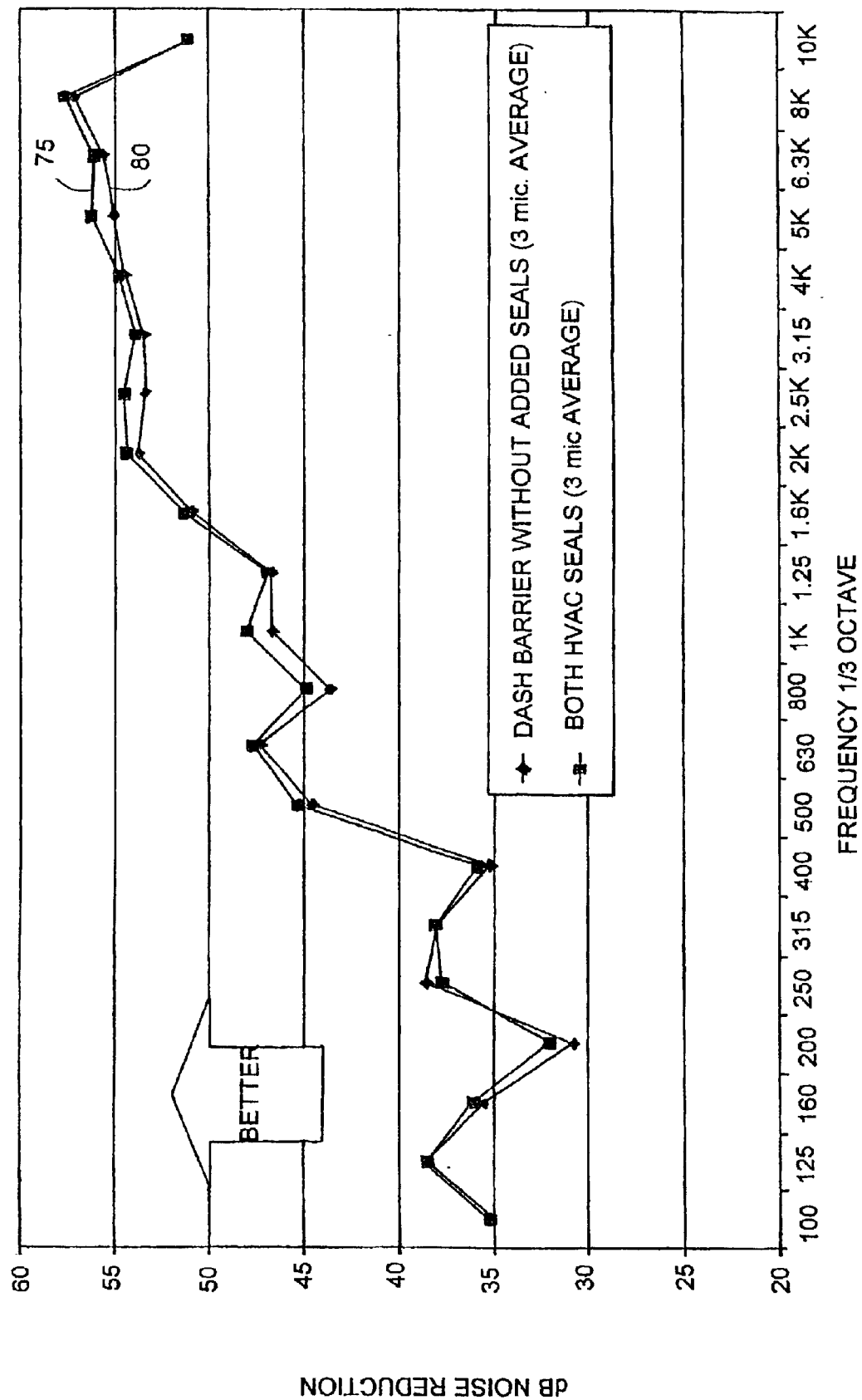
FIG. 6 is a graph comparing noise reduction as a function of frequency for the prior art arrangement shown in FIG. 1 with noise reduction for the embodiment of the invention shown in FIG. 5.

As shown in FIG. 6, the secondary barrier shown in FIG. 5 provides improved noise reduction (represented by curve 75), as compared with a conventional arrangement as shown in FIG. 1 (represented by curve 80).

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A vehicle comprising:

an engine compartment;

a passenger compartment;

a metal wall separating the passenger compartment from the engine compartment;

a primary acoustic barrier disposed adjacent the metal wall;

an aperture defined through the metal wall for passage of a conduit;

an aperture defined through the primary acoustic barrier for passage of the conduit, the aperture through the primary acoustic barrier being in registry with the aperture through the metal wall;

a vehicle component case mounted in the passenger compartment adjacent the primary acoustic barrier;

a moisture seal around the conduit for sealing between the conduit and the metal wall; and a secondary acoustic attenuator that is separate from the primary acoustic barrier and disposed between the primary acoustic barrier and to the component case, the secondary acoustic attenuator enveloping space around the conduit between the vehicle component case and the primary acoustic barrier.

2. The vehicle of claim 1, wherein the conduit is a tube for conveying refrigerant, and the vehicle component case is a housing for a heating, ventilation and air conditioning unit.

3. The vehicle of claim 1, wherein the secondary acoustic attenuator circumscribes the conduit in a space between the vehicle component case and the primary acoustic barrier.

4. The vehicle of claim 1, wherein the primary acoustic barrier is made of a filled thermoplastic or thermoset material.

5. The vehicle of claim 1, wherein the secondary acoustic attenuator is a fibrous mat or foam material.

6. The vehicle of claim 1, wherein the secondary acoustic attenuator is made of a filled thermoplastic or thermoset material.

7. The vehicle of claim 1, further comprising a sound absorbing decoupler layer disposed between the metal wall and the primary acoustic barrier.

8. The vehicle of claim 6, wherein the sound absorbing decoupler layer comprises a foam plastic material or a fibrous material.

9. A vehicle comprising:

an engine compartment;

a passenger compartment;

a metal wall separating the passenger compartment from the engine compartment;

a primary acoustic barrier disposed adjacent the metal wall;

an aperture defined through the metal wall for passage of a conduit;

an aperture defined through the primary acoustic barrier for passage of the conduit, the aperture through the primary acoustic barrier being in registry with the aperture through the metal wall;

a vehicle component case mounted in the passenger compartment adjacent the primary acoustic barrier;

a moisture seal around the conduit for sealing between the conduit and the metal wall; and a secondary acoustic barrier hingedly connected to the primary acoustic barrier to allow the secondary acoustic barrier to be pivoted, from an orientation that allows installation of the vehicle component case, to another orientation wherein the secondary acoustic barrier engages the vehicle component case to envelop space around the conduit between the vehicle component case and the primary acoustic barrier.

10. The vehicle of claim 9, wherein the primary acoustic barrier, secondary acoustic barrier, and a living hinge connecting the primary acoustic barrier to the secondary acoustic barrier are integrally molded together.

11. The vehicle of claim 9, wherein the primary acoustic barrier and the secondary acoustic barrier are formed separately and subsequently thermally or chemically fused together.

12. The vehicle of claim 9, wherein the conduit is a tube for conveying refrigerant, and the vehicle component case is a housing for a heating, ventilation and air conditioning unit.

13. The vehicle of claim 9, wherein the secondary acoustic barrier circumscribes the case when the secondary acoustic barrier is pivoted into engagement with the case, thereby eliminating all unimpeded paths for sound transmission.

14. The vehicle of claim 9, wherein the primary acoustic barrier is made of a filled thermoplastic or thermoset material.

15. The vehicle of claim 9, wherein the secondary acoustic barrier is made of a filled thermoplastic or thermoset material.

16. The vehicle of claim 9, further comprising a sound absorbing decoupler layer disposed between the metal wall and the primary acoustic barrier.

17. The vehicle of claim 16, wherein the sound absorbing decoupler layer comprises a foam plastic material or a fibrous material.

* * * * *

UNITED STATES PATENT AND TRADEMARK OFFICE
CERTIFICATE OF CORRECTION

PATENT NO. : 6,808,045 B2
DATED : October 26, 2004
INVENTOR(S) : Michael T. Campbell It is certified that error appears in the above-identified patent and that said Letters Patent is hereby corrected as shown below:

Title page,
Item [57], ABSTRACT,
Line 1, "systems" should be -- system --.

Column 5,
Line 37, delete "to".

Signed and Sealed this

Fifteenth Day of February, 2005

JON W. DUDAS
*Director of the United States Patent and Trademark Office*